(12) United States Patent
Norris et al.

(10) Patent No.: US 11,072,757 B2
(45) Date of Patent: Jul. 27, 2021

(54) SLIDEWAY LUBRICANTS

(71) Applicant: Afton Chemical Corporation, Richmond, VA (US)

(72) Inventors: Paul Norris, Bracknell (GB); Ralph Lumby, Woking (GB)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 15/983,357

(22) Filed: May 18, 2018

(65) Prior Publication Data

US 2019/0352576 A1    Nov. 21, 2019

(51) Int. Cl.
| | |
|---|---|
| C10M 137/00 | (2006.01) |
| C10M 137/12 | (2006.01) |
| C10M 137/02 | (2006.01) |
| C10M 137/10 | (2006.01) |
| C10N 40/22 | (2006.01) |

(52) U.S. Cl.
CPC ........ *C10M 137/12* (2013.01); *C10M 137/02* (2013.01); *C10M 137/105* (2013.01); *C10M 2223/049* (2013.01); *C10M 2223/06* (2013.01); *C10M 2223/065* (2013.01); *C10N 2040/22* (2013.01)

(58) Field of Classification Search
CPC .............. C10M 137/12; C10M 137/02; C10M 137/105; C10M 2223/049; C10M 2223/06; C10M 2223/065; C10N 2240/401

See application file for complete search history.

(56) References Cited

U.S. PATENT DOCUMENTS

| | | | |
|---|---|---|---|
| 3,793,199 A | 2/1974 | Schlicht | |
| 4,333,841 A * | 6/1982 | Schmidt | C07F 9/1651 508/428 |
| 5,824,628 A * | 10/1998 | Coates | C10M 137/00 508/433 |
| 7,648,948 B2 | 1/2010 | Wu et al. | |
| 2013/0072407 A1* | 3/2013 | Ryan | C07F 9/4006 508/422 |
| 2014/0051616 A1* | 2/2014 | Devlin | C10M 141/10 508/286 |
| 2015/0141306 A1 | 5/2015 | Devlin et al. | |

FOREIGN PATENT DOCUMENTS

| | | | | |
|---|---|---|---|---|
| EP | 0711822 A2 * | 5/1996 | | C10M 133/02 |
| EP | 0711822 B1 | 9/2006 | | |
| EP | 1840194 A1 | 10/2007 | | |
| GB | 1469479 A | 4/1977 | | |

OTHER PUBLICATIONS

EP Search report dated Sep. 2, 2019 for EP Application 19174247.7.

* cited by examiner

*Primary Examiner* — Taiwo Oladapo
(74) *Attorney, Agent, or Firm* — Honigman LLP

(57) ABSTRACT

The present disclosure relates to lubricating oil compositions, and in particular, lubricating oil compositions for slideway applications, additive compositions for the slideway lubricants, and methods of lubricating a machine part, such as a slideway with the lubricating oil compositions. In one aspect, the lubricating oil compositions have a composition that provides both good friction performance and good separability from metal working fluids at the same time.

13 Claims, 3 Drawing Sheets

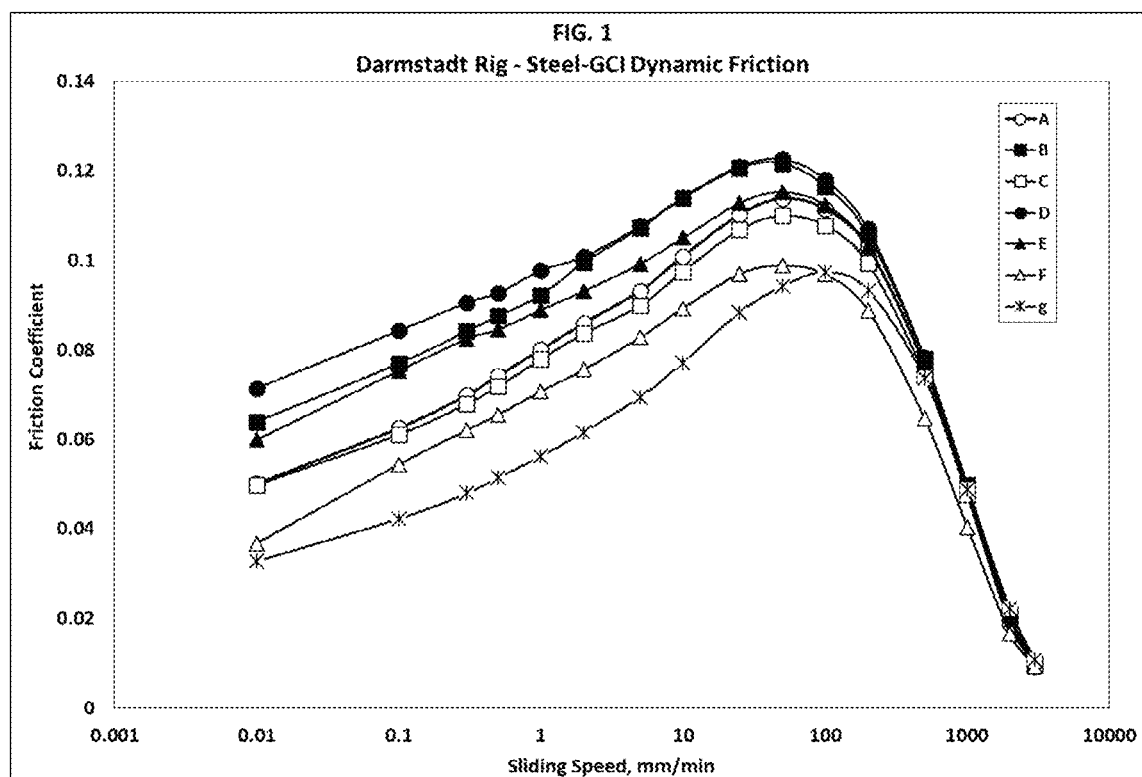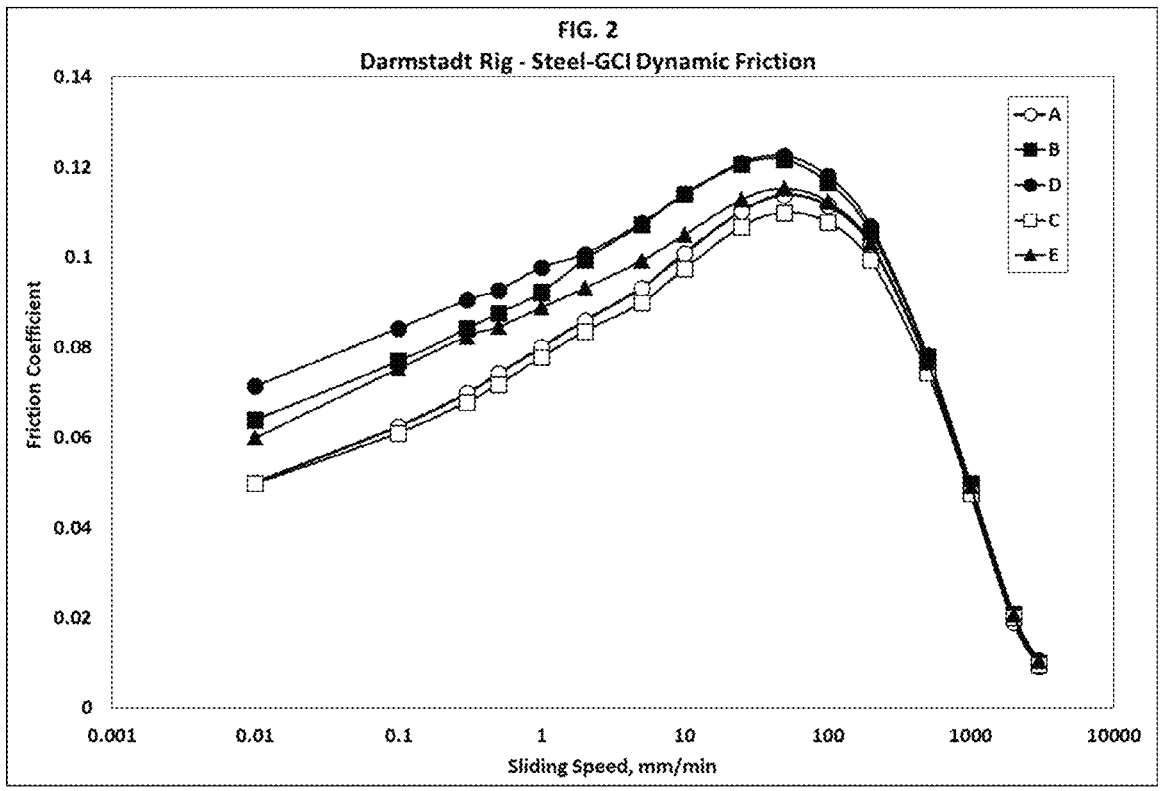

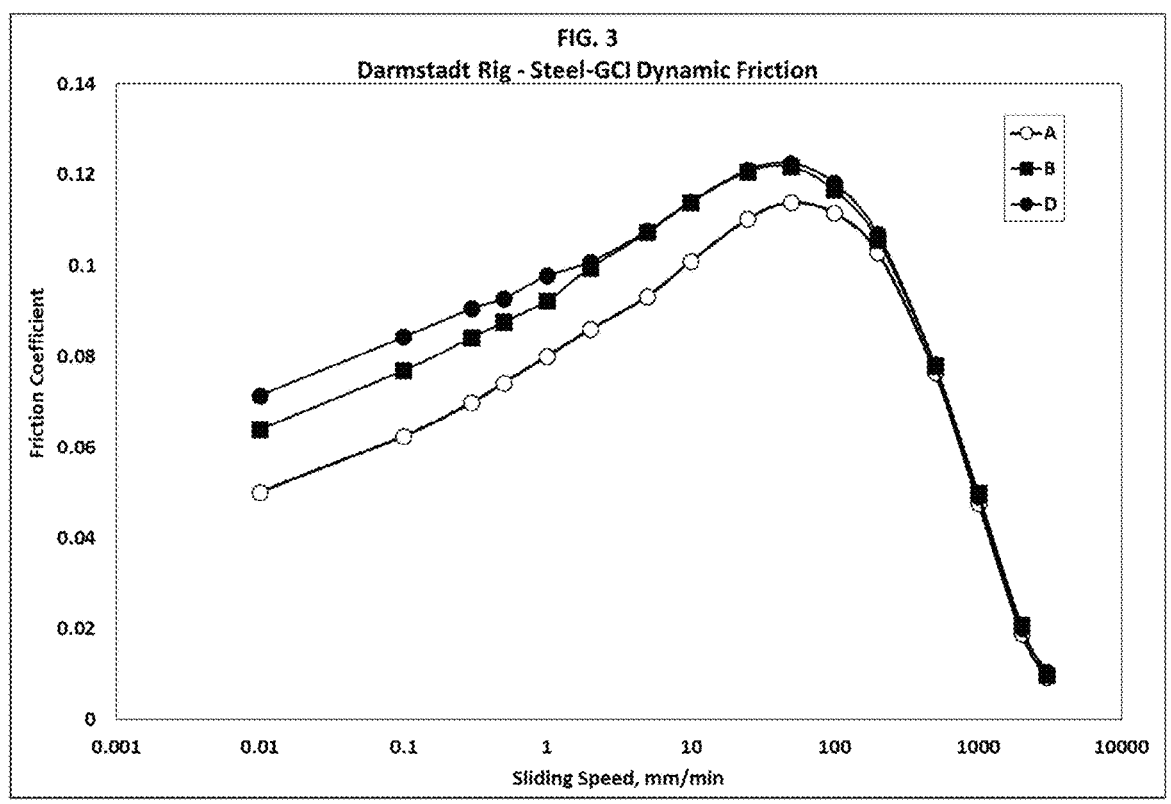
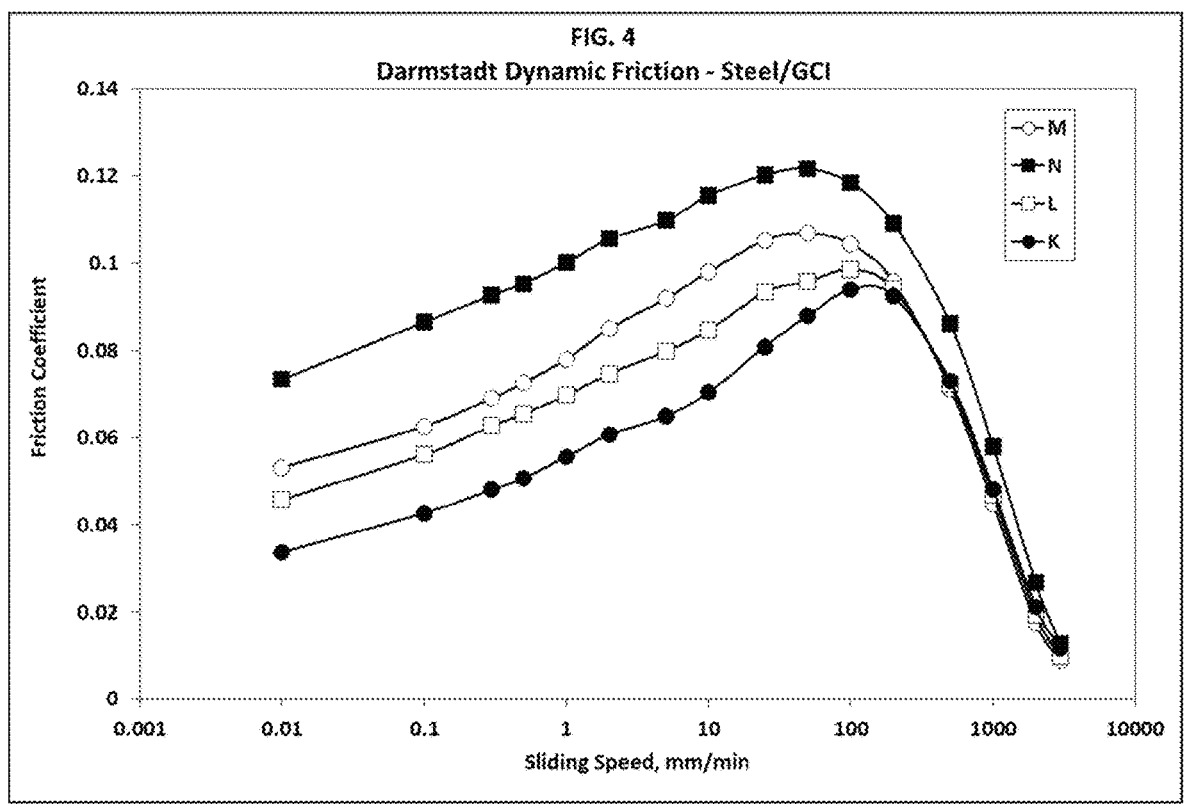

SLIDEWAY LUBRICANTS

FIELD

The present disclosure relates to lubricant additives, use of such additives in lubricating oil compositions, and, in particular, lubricating oil compositions for slideway applications.

BACKGROUND

Slideways are mechanical interfaces used in manufacturing machines typically to ensure the accurate positioning and movement of a tool relative to a work piece. Slideways are commonly found in a variety of machinery, such as machine tools within the metalworking industries, but also in hydraulic presses, injection molding machines, transfer lines and other machines where very precise linear movement of one part of the machine relative to another is required. A traditional hydrodynamic slideway includes two parallel surfaces that slide over each other and, in view of this constant sliding, a lubricant is periodically applied between the surfaces. During operation, used slideway lubricant often runs-off or leaks-out of the slideway. As a result, new lubricant is regularly applied.

In a manufacturing machine that performs cutting or grinding operations, a slideway is often used to help position the cutting or grinding tool relative to the workpiece. In these operations, a metalworking fluid (MWF), which is often a water-based emulsion, is sprayed onto the point of cutting or grinding. The MWF is typically captured in a sump or lower tank, normally situated underneath the machine, and then re-used or re-circulated through the machine. The entire sump fluid will be recirculated several times per shift during constant machining operations. The life of a single charge of MWF is often several months.

Because the slideway lubricant often runs-off or leaks-out of the slideway, such slideway lubricant may end up in the MWF contained in the sump. Some of this lubricant will become entrained in the MWF emulsion or, alternatively, will form a layer of tramp oil on the more dense aqueous MWF emulsion. If the contamination of the slideway lubricant in the MWF becomes excessive, the MWF tends to degrade in terms of performance and eventually the sump must be emptied, cleaned, and be recharged with fresh MWF. Changing out the MWF incurs substantial cost in terms of new material, waste, and machine downtime.

When formulating a slideway lubricant, both friction performance and the ability to separate the lubricant from the MWF are important factors. Thus, a slideway lubricant that provides good friction performance between the slideway components and also exhibits fast separability from a range of MWFs would be desirable. However, it is well known that conventional slideway lubricants suffer a trade-off between good friction performance and good MWF separability. Prior slideway lubricants that were formulated to provide high friction performance; unfortunately, exhibited a decrease in separability (and vice versa). Prior slideway lubricants provided either good friction performance, good MWF separability, or were mediocre at both features.

BRIEF DESCRIPTION OF THE FIGURES

FIG. 1 is a graph of friction coefficient as measured on a Darmstadt Rig;

FIG. 2 is another graph of friction coefficient as measured on a Darmstadt Rig;

FIG. 3 is another graph of friction coefficient as measured on a Darmstadt Rig;

FIG. 4 is another graph of friction coefficient as measured on a Darmstadt Rig;

SUMMARY

Figure 5:
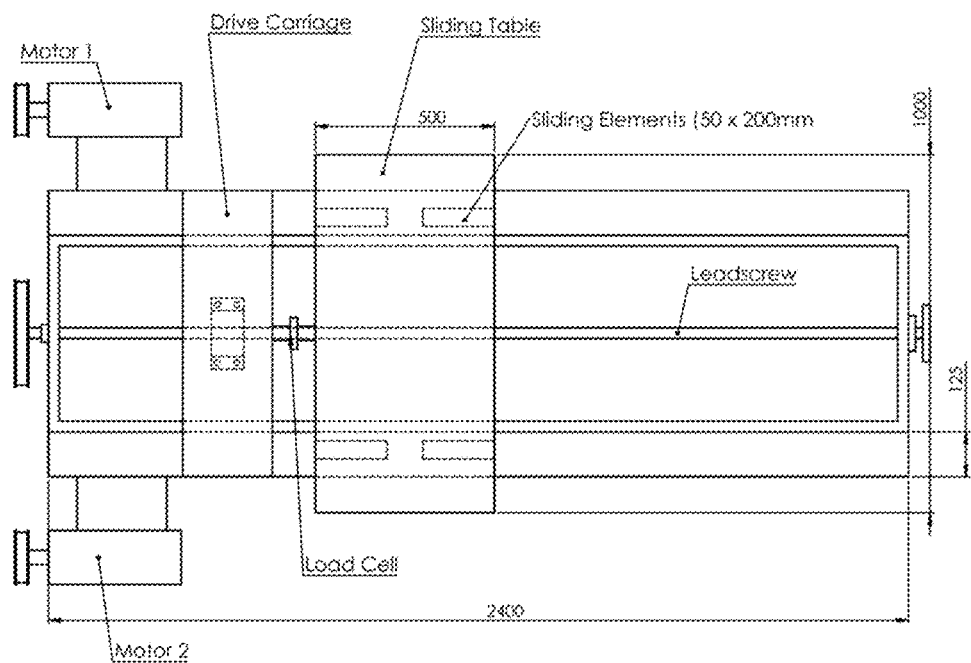
FIG. 5 is an exemplary schematic of a Darmstadt Rig used for measuring friction coefficient herein.

In one aspect or embodiment, a slideway lubricant composition exhibiting good friction performance and good separability from metal working fluid at the same time is described herein. In some approaches, the slideway lubricant composition includes a major amount of a base lubricating oil, a phosphorous containing friction modifier providing about 0.01 to about 1 weight percent of a hydrocarbyl phosphonate monoester to the slideway lubricant composition, and wherein the hydrocarbyl phosphonate monoester includes a C1 to C4 alkyl group in the monoester moiety and 12 to 30 carbon atoms in the hydrocarbyl moiety. In some approaches, the slideway lubricant composition also has a lower friction coefficient than a slideway lubricant composition including the same amount of a phosphonate diester (instead of the monoester) and wherein the slideway lubricant composition also has an average one hour SKC separability from metal working fluids lower than about 2.

In other aspects or embodiments, the slideway lubricant composition of the previous paragraph may be combined with one or more optional features either individually or in any combination thereof. These features include wherein the phosphorous containing friction modifier further provides about 0.01 to about 0.5 weight percent of a diester hydrogen phosphite to the slideway lubricant composition; and/or wherein the phosphorous containing friction modifier has a weight ratio of the hydrocarbyl phosphonate monoester to the diester hydrogen phosphite from about 0.02:1 to about 10:1; and/or wherein an amount of phosphorous in the form of a phosphonate in the phosphorous containing friction modifier is about 30 to about 80 percent of the total phosphorous provided by the hydrocarbyl phosphonate monoester and the diester hydrogen phosphite; and/or wherein the hydrocarbyl phosphonate monoester has the formula

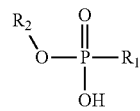

wherein $R_1$ is a $C_{12}$ to $C_{30}$ hydrocarbyl group and $R_2$ is a methyl or ethyl group; and/or wherein the diester hydrogen phosphite has the formula

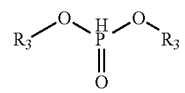

wherein each $R_3$ is independently a $C_1$ to $C_{30}$ hydrocarbyl group; and/or further comprising less than about 0.25 weight percent of a phosphonate diester; and/or wherein the phosphonate diester has the formula

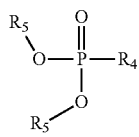

wherein $R_4$ is a $C_1$ to $C_{30}$ hydrocarbyl group and each $R_5$ is independently a $C_1$ to $C_4$ alkyl groups; and/or wherein the slideway lubricant composition further includes one or more amine salts of phosphate esters derived from mono or di-alkyl or alkenyl phosphate esters and alkyl or alkenyl primary or secondary amines; and/or wherein the slideway lubricant composition further includes sulfur-containing lubricant additives selected from sulfurized hydrocarbons, sulfurized olefins, dialkyl polysulfides, diarylpolysulfides, sulfurized fatty acids, sulfurized fatty acid esters, and mixtures thereof, and/or further comprising an acidic thiophosphate or a thiophosphate ester; and/or wherein the acidic thiophosphate or thiophosphate ester has the formula

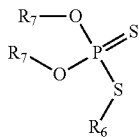

wherein $R_6$ is a C1 to C10 linear or branched carboxylic group or a C1 to C10 linear or branched alkyl alkanoate group and each $R_7$ is independently a linear or branched C1 to C10 hydrocarbyl group; and/or further comprising saturated, monounsaturated, or polyunsaturated C12 to C30 fatty acids or fatty acid esters.

In another aspect, the present disclosure also provides for the use of any of the lubricating oil compositions of the previous two paragraphs to achieve a lower friction coefficient than a slideway lubricant composition including the same amount of a phosphonate diester (instead of the monoester) and also an average one hour SKC separability from metal working fluids lower than about 2 at the same time.

In yet another aspect, the present disclosure provides for a method of lubricating a slideway component. In one approach or embodiment, the method includes applying a lubricant composition to the slideway component and operating the slideway. The lubricant composition includes a major amount of a base lubricating oil and a phosphorous containing friction modifier providing about 0.01 to about 1 weight percent of a hydrocarbyl phosphonate monoester to the slideway lubricant composition, and the hydrocarbyl phosphonate monoester including a C1 to C4 alkyl group in the monoester moiety and 12 to 30 carbon atoms in the hydrocarbyl moiety. In some approaches of the method, the slideway lubricant composition has a lower friction coefficient than a slideway lubricant composition including the same amount of a phosphonate diester (instead of the monoester); and wherein the slideway lubricant composition also has an average one hour SKC separability from a metal working fluids lower than about 2.

In other aspects or embodiments, the methods of the previous paragraph may be combined with one or more optional features either individually or in any combination thereof. These features include wherein the phosphorous containing friction modifier further provides about 0.01 to about 0.5 weight percent of a diester hydrogen phosphite to the slideway lubricant composition; and/or wherein the phosphorous containing friction modifier has a weight ratio of the hydrocarbyl phosphonate monoester to the diester hydrogen phosphite from about 0.02:1 to about 10:1; and/or wherein an amount of phosphorous in the form of a phosphonate in the phosphorous containing friction modifier is about 30 to about 80 percent of the total phosphorous provided by the hydrocarbyl phosphonate monoester and the diester hydrogen phosphite; and/or wherein the hydrocarbyl phosphonate monoester has the formula

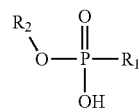

wherein $R_1$ is a $C_{12}$ to $C_{30}$ hydrocarbyl group and $R_2$ is a methyl or ethyl group; and/or wherein the diester hydrogen phosphite has the formula

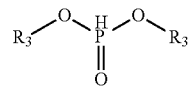

wherein each $R_3$ is independently a $C_1$ to $C_{30}$ hydrocarbyl group; and/or further comprising less than about 0.25 weight percent of a phosphonate diester; and/or wherein the phosphonate diester has the formula

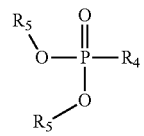

wherein $R_4$ is a $C_1$ to $C_{30}$ hydrocarbyl group and each $R_5$ is independently a $C_1$ to $C_4$ alkyl group; and/or wherein the slideway lubricant composition further includes one or more amine salts of phosphate esters derived from mono or di-alkyl or alkenyl phosphate esters and alkyl or alkenyl primary or secondary amines; and/or wherein the slideway lubricant composition further includes sulfur-containing lubricant additives selected from sulfurized hydrocarbons, sulfurized olefins, dialkyl polysulfides, diarylpolysulfides, sulfurized fatty acids, sulfurized fatty acid esters, and mixtures thereof; and/or further comprising an acidic thiophosphate or a thiophosphate ester; and/or wherein the acidic thiophosphate or thiophosphate ester has the formula

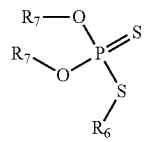

wherein $R_6$ is a C1 to C10 linear or branched carboxylic group or a C1 to C10 linear or branched alkyl alkanoate group and each $R_7$ is independently a linear or branched C1 to C10 hydrocarbyl group; and/or further comprising saturated, monounsaturated, or polyunsaturated C12 to C30 fatty acids or fatty acid esters.

DETAILED DESCRIPTION

The present disclosure relates to lubricating oil compositions, and in particular, lubricating oil compositions for slideway applications, additive compositions for the slideway lubricants, and methods of lubricating a machine part, such as a slideway with the lubricating oil compositions. In one aspect, the lubricating oil compositions herein have a composition that provides both good friction performance and good separability from metal working fluids (MWF) at the same time. In another aspect, the lubricating oil compositions herein include select phosphorus-containing friction modifiers or additives in amounts and ratios effective to achieve these dual benefits. For example, the lubricating oil compositions include select phosphonate monoesters optionally in combination with phosphite diesters. In some approaches, the lubricating oil compositions are also free of or, alternatively, include select low amounts of phosphonate diester additives. It has been discovered that this unique combination of phosphorus additives and treat rates of such phosphorus additives enable a slideway lubricant composition to provide excellent friction performance and, at the same time, provide quick separation from MWF as compared to prior lubricants.

As used herein, friction performance refers to a dynamic friction in terms of a dynamic friction coefficient or simply friction coefficient as evaluated using a Darmstadt Rig as described in the paper Slideway Lubrication and Friction Testing, Ingram, M. and Norris, P., $10^{th}$ *International Symposium on Fuels and Lubricants*, 2016 *Paper ID*-070, which is incorporated herein by reference in its entirety and described more fully below in the Examples.

Figure 6:
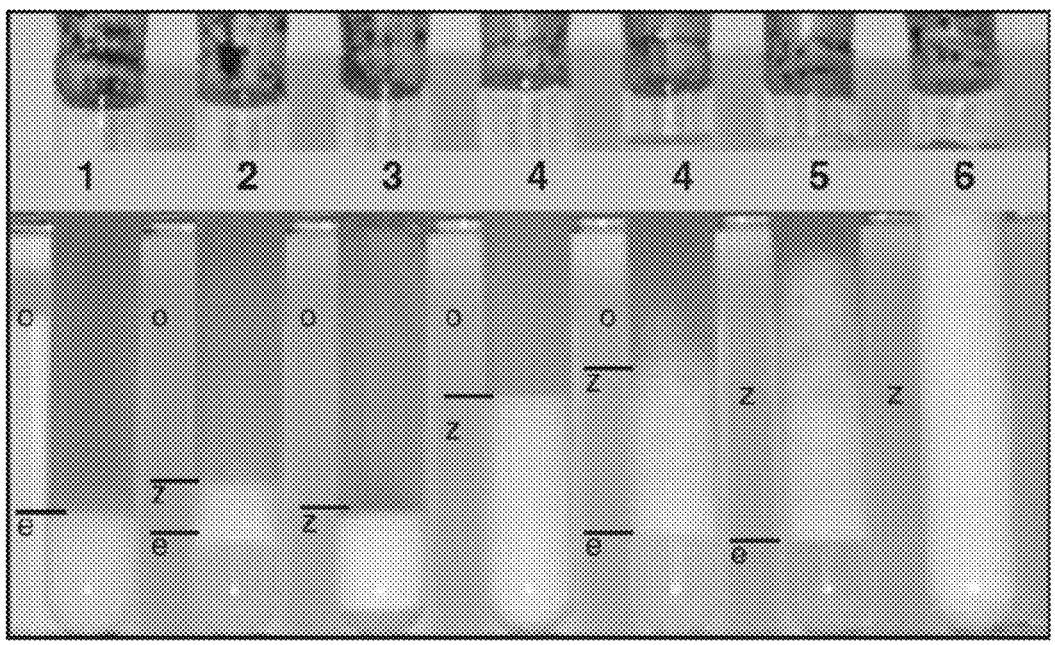
FIG. 6 are images showing an exemplary coolant separability rating scale.

Separability from metal working fluids is measured using the SKC coolant separability test available from SKC Gleittechnik, GmbH, Germany. This test is the most well-known industry test method for measuring the separability of a slideway lubricant from various metal working fluids. In this test, aliquots of the lubricant are individually mixed with 12 different MWFs and the degree of separability is measured after 1 hour, 24 hours, and 7 days (typically about 2 ml of coolant and about 8 ml of lubricating oil composition). The relative separation is described by a rating where 1 refers to complete separation and 6 refers to no separation (or complete emulsification). Average ratings of the 12 separability evaluations of about 1 or about 2 are considered acceptable, and the unique slideway lubricants herein generally provide average SKC separability results after 1 hour of about 2 or less, and in some approaches, less than about 2. FIG. 6 herein illustrates the separation differences for each level of rating between 1 and 6 per the SKC test method.

As used herein, the term "hydrocarbon soluble" means that the compound is substantially suspended or dissolved in a hydrocarbon material, as by reaction or complexation of a reactive metal compound with a hydrocarbon material. As used herein, "hydrocarbon" means any of a vast number of compounds containing carbon, hydrogen, and/or oxygen in various combinations.

If used, the term "hydrocarbyl" refers to a group having a carbon atom directly attached to the remainder of the molecule and having predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, and sulfoxy); (3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group. A "hydrocarbyl group" may also refers to a group that has a carbon atom directly attached to a remainder of the molecule and each hydrocarbyl group is independently selected from hydrocarbon substituents, and substituted hydrocarbon substituents may contain one or more of halo groups, hydroxyl groups, alkoxy groups, mercapto groups, nitro groups, nitroso groups, amino groups, sulfoxy groups, pyridyl groups, furyl groups, thienyl groups, imidazolyl groups, sulfur, oxygen and nitrogen, and wherein no more than two non-hydrocarbon substituents are present for every ten carbon atoms in the hydrocarbyl group.

As used herein, the term "major amount" is understood to mean an amount greater than or equal to 50 weight percent, for example from about 80 to about 99.5 weight percent relative to the total weight of the composition, in other approaches, about 90 to about 99.5 weight percent, and in yet further approaches, about 50 to about 99.5 weight percent. Moreover, as used herein, the term "minor amount" is understood to mean an amount less than 50 weight percent relative to the total weight of the composition.

For purposes of this disclosure, the chemical elements are identified in accordance with the Periodic Table of the Elements, CAS version, Handbook of Chemistry and Physics, 75th Ed. Additionally, general principles of organic chemistry are described in "Organic Chemistry", Thomas Sorrell, University Science Books, Sausolito: 1999, and "March's Advanced Organic Chemistry", 5th Ed., Ed.: Smith, M. B. and March, J., John Wiley & Sons, New York: 2001, the entire contents of which are hereby incorporated by reference.

Turning to more of the specifics, the lubricating oil compositions of the present disclosure include additives that provide select metal-free, phosphorus-containing compounds. In one approach, the metal-free, phosphorus-containing compounds include a phosphonate monoester that is optionally combined with a diester phosphite in amounts and relative ratios thereof effective to achieve both high friction performance and fast 1 hour SKC separability at the same time. The phosphorus-containing additive may also include select amounts of phosphonate diesters, but low treat rates of this optional additive are desired in order to maintain the dual benefits of friction and separability. In other approaches, the lubricating oil compositions are free of the phosphonate diesters (such as less than about 0.05 weight percent, in other approaches, less than about 0.01 weight percent, and in yet further approaches, none).

Phosphonate Monoesters

The lubricating oil compositions herein are treated with or include phosphonate monoesters and, in particular, hydrocarbyl phosphonate monoesters. In some approaches, the hydrocarbyl phosphonate monoesters have the following Formula I

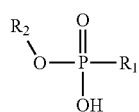

(Formula I)

wherein $R_1$, the hydrocarbyl moiety, is a linear or branched C12 to C30 hydrocarbyl chain and $R_2$, the monoester moiety, is a linear or branched C1 to C4 alkyl group. In alternative approaches, $R_2$ is a methyl or ethyl group. The amount of the phosphonate monoester, such as the hydrocarbyl phosphonate monoesters described herein, is about 0.01 to about 1 weight percent based on a total weight of the lubricating oil composition, in other approaches, about 0.01 to about 0.7 percent, in yet further approaches, about 0.05 to about 0.5 percent, in yet further approaches, about 0.01 to about 0.4 weight percent, in yet other approaches, about 0.01 to about 0.2, about 0.01 to about 0.1, about 0.01 to about 0.05, or about 0.01 to about 0.03 weight percent.

Suitable phosphonates may also include primary alkyl acyclic hydrocarbyl phosphonates in which the primary alkyl group includes 1 to 4 carbon atoms and in which the acyclic hydrocarbyl group bonded to the phosphorus atom contains 12 to 30 carbon atoms and, in some approaches, is a linear hydrocarbyl group free of acetylenic unsaturation. In other approaches, the acyclic hydrocarbyl group includes 12 to 24 carbon atoms, and in yet further approaches, 12 to 20 carbon atoms.

Exemplary phosphonate compounds include methyl hydrocarbyl phosphonates, ethyl hydrocarbyl phosphonates, propyl hydrocarbyl phosphonates, butyl hydrocarbyl phosphonates, iso-butyl hydrocarbyl phosphonates, and wherein, in each case, the hydrocarbyl group is preferably linear, saturated, or contains one or more olefinic double bonds with each double bond preferably being an internal double bond. Other suitable compounds include those in which the hydrocarbyl group bonded to the phosphorus atom contains 16 to 20 carbon atoms or 18 to 20 carbon atoms. A particularly suitable phosphonate monoester compound may be ethyl octadecyl phosphonate or methyl octadecyl phosphonate. Other examples of suitable phosphonate monoesters include, but are not limited to, methyl triacontyl phosphonate, methyl triacontenyl phosphonate, methyl eicosyl phosphonate, methyl hexadecyl phosphonate, methyl hexadecenyl phosphonate, methyl tetracontenyl phosphonate, methyl hexacontyl phosphonate, methyl dodecyl phosphonate, methyl dodecenyl phosphonate, ethyl triacontyl phosphonate, ethyl triacontenyl phosphonate, ethyl eicosyl phosphonate, ethyl hexadecyl phosphonate, ethyl hexadecenyl phosphonate, ethyl tetracontenyl phosphonate, ethyl hexacontyl phosphonate, ethyl dodecyl phosphonate, ethyl dodecenyl phosphonate, and the like compounds, and mixtures thereof.

Phosphite Diesters

The lubricating oil compositions herein may also include a phosphite diester, and in particular, a diester hydrogen phosphite in combination with the hydrocarbyl phosphonate monoester described above. In some approaches, the phosphite diester may have the following Formula II

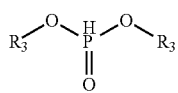

(Formula II)

wherein each $R_3$ is independently selected form a C1 to a C30 hydrocarbyl chain. If included in the composition, the amount of the phosphite diester, such as the diester hydrogen phosphite described herein, is about 0.01 to about 0.5 weight percent based on a total weight of the lubricating oil composition, in other approaches, about 0.01 to about 0.2 percent, in yet further approaches, about 0.1 to about 0.2 percent, and in yet further approaches, about 0.01 to about 0.2 weight percent.

In some approaches, the phosphite may be a dialkyl or a dialkenyl hydrogen phosphite ester. The alkyl or alkenyl groups of the phosphite may independently contain from 1 to about 30 carbon atoms, in other approaches, about 10 to about 24 carbon atoms, and in yet further approaches, about 10 to about 20 carbon atoms. A number of dialkyl or dialkenyl phosphites may be suitable, such as lower to higher dialkyl/dialkenyl phosphites including the lower dialkyl phosphites of dimethyl, diethyl, dipropyl, dibutyl, dipentyl, and dihexyl phosphites and the higher alkenyl phosphites of dioleyl, dicetyl, and distearyl phosphites. Also mixed alkyl/alkenyl phosphites, made from a mixture of alcohols, are useful in the present composition. Examples of mixtures of alcohols include ethyl and butyl alcohol, propyl and pentyl alcohol, and methyl and pentyl alcohol to suggest a few. Mixtures of those phosphites mentioned above may also be included in the compositions. A particularly useful phosphite is dioleyl hydrogen phosphite.

In some approaches, the lubricating oil compositions herein include a phosphorus-containing additive having a blend of the hydrocarbyl phosphonate monoester and the diester hydrogen phosphite as those compounds are described in the previous paragraphs. In these embodiments, the compositions may include about 0.01 to about 1 weight percent of the hydrocarbyl phosphonate monoester and about 0.01 to about 0.5 weight percent of the diester hydrogen phosphite (or other ranges as described above for each compound). In some embodiments, the phosphorus-containing additive including a blend of these two components may also have a weight ratio of the hydrocarbyl phosphonate monoester to the diester hydrogen phosphite from about 0.02:1 to about 10:1, in other approaches, a ratio of about 0.03:1 to about 7.5:1, and in yet further approaches, a ratio of about 0.04:1 to about 5:1. In other embodiments, the phosphorus-containing additive including the blend of the two phosphorus-containing components provides phosphorus in the form of a phosphonate and an amount of the phosphorus in the form of a phosphonate is about 30 to about 80 percent of the total phosphorus provided by the hydrocarbyl phosphonate monoester and the diester hydrogen phosphite combined.

Phosphonate Diester

Optionally, the lubricating oil compositions herein may further include low amounts of phosphonate diesters. If included, the compositions may include less than about 0.25 weight percent, in other approaches, less than about 0.2 weight percent, in further approaches, less than about 0.15 percent, and in yet further approaches, about 0.1 percent or less of the phosphonate diesters, and in yet other approaches, none. In some approaches, the phosphonate diesters may have the following Formula III

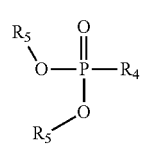

(Formula III)

wherein $R_4$ is a C1 to C30 hydrocarbyl chain and each $R_5$ is independently a C1 to C10 alkyl group and preferably a C1 to C4 alkyl group.

If used, suitable phosphonate diesters may include O,O-di-(primary alkyl)acyclic hydrocarbyl phosphonates in which the primary alkyl groups are the same or different and each independently containing 1 to 4 carbon atoms and in which the acyclic hydrocarbyl group bonded to the phosphorus atom may contain 12 to 30 carbon atoms and is a linear hydrocarbyl group free of acetylenic unsaturation. Exemplary compounds include O,O-dimethyl hydrocarbyl phosphonates, O,O-diethyl hydrocarbyl phosphonates, O,O-dipropyl hydrocarbyl phosphonates, O,O-dibutyl hydrocarbyl phosphonates, O,O-diiso-butyl hydrocarbyl phosphonates, and analogous compounds in which the two alkyl groups differ, such as, for example, O-ethyl-O-methyl hydrocarbyl phosphonates, O-butyl-O-propyl hydrocarbyl phosphonates, and O-butyl-O-isobutyl hydrocarbyl phosphonates, wherein in each case the hydrocarbyl group is linear and is saturated or contains one or more olefinic double bonds, each double bond preferably being an internal double bond. Suitable compounds include compounds in which both O,O-alkyl groups are identical to each other. Other suitable compounds include compounds in which the hydrocarbyl group bonded to the phosphorus atom contains 16 to 20 carbon atoms. A particularly suitable hydrocarbyl phosphonate diester is dimethyl octadecyl phosphonate. Other examples of suitable phosphonate diesters include, but are not limited to, dimethyl triacontyl phosphonate, dimethyl triacontenyl phosphonate, dimethyl eicosyl phosphonate, dimethyl hexadecyl phosphonate, dimethyl hexadecenyl phosphonate, dimethyl tetracontenyl phosphonate, dimethyl hexacontyl phosphonate, dimethyl dodecyl phosphonate, dimethyl dodecenyl phosphonate and the like. In a particular embodiment, the lubricating oil compositions herein do not include any dimethyl octadecylphosphonate.

Base Oils

The slideway lubricating compositions of the present disclosure may also include one or more base oils of lubricating viscosity. In some approaches, the compositions include a major amount of the base oil, such as about 85 to about 99.5 weight percent, in other approaches, about 90 to about 99.5 weight percent of the base oil. The base oil typically has a viscosity of about 2.5 to about 25 cSt and, preferably, about 2.5 to about 21 cSt at 100° C.

Base oils suitable for use in formulating the compositions described herein may be selected from any of the synthetic or natural oils or mixtures thereof. The synthetic base oils include alkyl esters of dicarboxylic acids, polyglycols and alcohols, poly-alpha-olefins, including polybutenes, alkyl benzenes, organic esters of phosphoric acids, polysilicone oils, and alkylene oxide polymers, interpolymers, copolymers and derivatives thereof where the terminal hydroxyl groups have been modified by esterification, etherification, and the like.

Natural base oils include animal oils and vegetable oils (e.g., castor oil, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Supplemental Lubricant Additives:

The slideway lubricant compositions of the present disclosure may also contain supplemental additives as needed for a particular application. For example, supplemental additives may include antioxidants, carrier fluids, metal deactivators, corrosion inhibitors, biocides, antistatic additives, demulsifiers, friction modifiers, surfactants, pour point depressants, viscosity modifiers, extreme pressure agents, antiwear agents, tackiness agents, and mixtures thereof.

Extreme Pressure Agents/Antiwear Agents

Oil-soluble amine salts of organic acid phosphates are an optional category of auxiliary phosphorus-containing additives for use in the fluids of this disclosure, in some instances, as extreme pressure agents and/or antiwear agents. Sulfur-containing analogs of any of the foregoing compounds can also be used, but are less preferred. A suitable example may be an amine phosphate antiwear/extreme pressure agent may be hexyl phosphate, di-tri-decylamine.

In some approaches or embodiments, the extreme pressure agents and/or anti-wear additives may also include one or more amine salts of phosphate esters. In some approaches, the amine salts of phosphate esters may be derived from mono or di-alkyl or alkenyl phosphate esters and alkyl or alkenyl primary or secondary amines. The mono or di-alkyl or alkenyl phosphate esters may include C1 to C20 carbon chains and, in some approaches, C4 to C18 carbon chains. The alkenyl primary or secondary amines may be C1 to C20 alkyl or alkenyl amines, such as C6 to C20 alkyl or alkenyl amines. One suitable amine salt of phosphate ester may be hexyl phosphate, di-tridecylamine. If used, the lubricating oil compositions may include about 0.08 to about 0.8 weight percent of a phosphorus-containing antiwear agent. In other approaches, the lubricating oil compositions herein may include about 0.08 to about 0.5 weight percent.

Antioxidants

The lubricating oil compositions herein also may optionally contain one or more antioxidants. Antioxidant compounds include, for example, sulfur-containing lubricant additives. Examples include sulfurized hydrocarbons, phenates, phenate sulfides, sulfurized olefins, dialkyl polysulfides, diaryl polysulfides, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, sulfurized fatty acids, sulfurized fatty acid esters, or mixtures thereof. These antioxidants may be used alone or in combination.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In an embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 30 carbon atoms and, in other approaches, 12 to 22 carbon atoms. Examples of suitable fatty acids and their esters include triglycerides, oleic acid, linoleic acid, palmitoleic acid, elaidic acid, stearic acid, or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

If used, sulfurized hydrocarbons as described herein may be provided in about 0.08 to about 0.25 weight percent in the lubricating oil compositions herein. In other approaches, phenolic and aminic antioxidants, if used, may be included at about 0.05 to about 0.5 weight percent in the composition.

Sulfur Containing Phosphoric Acid Ester

In other approaches or embodiments, the slideway lubricant of the present disclosure may further include an acidic thiophosphate or a thiophosphate ester. In some approaches, the acidic thiophosphate or thiophosphate ester has the formula

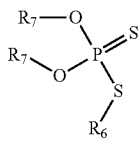

wherein $R_6$ is a C1 to C10 linear or branched carboxylic group or a C1 to C10 linear or branched alkyl alkanoate group and each $R_7$ is independently a linear or branched C1 to C10 hydrocarbyl group. Exemplary thiophosphates are available under the tradenames Irgalube 353 and/or Irgalube 63. Exemplary amounts of the acidic thiophosphate and/or the thiophosphate esters, if used, may be about 0.01 to about 0.05 weight percent of the lubricant.

In other approaches, the lubricating compositions may also include at least one sulfur-containing phosphoric acid ester. The sulfur-containing phosphoric acid ester has one or more sulfur to phosphorus bonds. In one embodiment, the sulfur-containing phosphorus acid ester is referred to as an acidic thiophosphate, thiophosphate ester, thiophosphorus acid or salt thereof. The thiophosphorus acid esters may be dithiophosphorus acid esters. Thiophosphorus acid esters are also referred to generally as dithiophosphates.

Friction Modifier Components

A suitable friction modifier, if used, may be a metal-free, amine-containing friction modifier according to the following general formula:

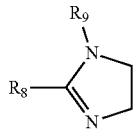

wherein $R_8$ is an alkyl or alkenyl group containing from about 10 to about 30 carbon atoms and $R_9$ is a hydroxyalkyl group containing from about 2 to about 4 carbon atoms. A particularly suitable metal-free, amine-containing friction modifier may be a hydroxyalkyl alkenyl glyoxalidine such as 2-(2-heptadec-1-enyl-4,5-dihydroimidazol-1-yl)ethanol available from Lonza of Allendale, N.J. under the trade name UNAAMINE O. If used, the amount of metal-free, amine-containing friction modifier in the lubricant composition may range from about 0.01 to about 1.0 percent by weight based on the total weight of the lubricant composition.

In addition to the aforementioned metal-free, amine containing friction modifiers, compositions of the present disclosure may include additional friction modifiers. Glycerides may be used alone or in combination with other friction modifiers. Suitable glycerides may include glycerides of the formula:

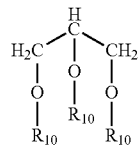

wherein each $R_{10}$ is independently selected from the group consisting of H and C(O)R' where R' may be a saturated or an unsaturated alkyl group having from 3 to 23 carbon atoms. Examples of glycerides that may be used include glycerol monolaurate, glycerol monomyristate, glycerol monopalmitate, glycerol monostearate, and monoglycerides derived from coconut acid, tallow acid, oleic acid, linoleic acid, and linolenic acids. Typical commercial monoglycerides contain substantial amounts of the corresponding diglycerides and triglycerides. Any ratio of mono- to di-glyceride may be used, however, it is preferred that from 30 to 70% of the available sites contain free hydroxyl groups (i.e., 30 to 70% of the total R groups of the glycerides represented by the above formula are hydrogen). A preferred glyceride is glycerol monooleate, which is generally a mixture of mono, di, and tri-glycerides derived from oleic acid, and glycerol. Suitable commercially-available glycerides include glycerol monooleates, which may generally contain approximately 50% to 60% free hydroxyl groups.

Corrosion Inhibitors

In yet further approaches or embodiments, the slideway lubricant compositions of the present disclosure may further include saturated, monounsaturated, or polyunsaturated C12 to C30 fatty acids or fatty acid esters. In some approaches, the compounds herein may also function as friction modifiers and/or corrosion inhibitors at the same time. If used, the lubricant compositions may include about 0.005 to about 0.1 weight percent of the fatty acids or fatty acid esters.

In other embodiments, copper corrosion inhibitors may constitute another class of additives suitable for inclusion in the compositions. Such compounds include thiazoles, triazoles and thiadiazoles. Examples of such compounds include benzotriazole, tolyltriazole, octyltriazole, decyltriazole, dodecyltriazole, 2-mercapto benzothiazole, 2,5 dimercapto-1,3,4-thiadiazole, 2-mercapto-5-hydrocarbylthio-1,3,4-thiadiazoles, 2-mercapto-5-hydrocarbyl dithio-1,3,4-thiadiazoles, 2,5-bis(hydrocarbylthio-1,3,4-thiadiazoles, and 2,5-bis (hydrocarbyldithio)-1,3,4-thiadiazoles. Suitable compounds include the 1,3,4-thiadiazoles, a number of which are available as articles of commerce, and also combinations of triazoles such as tolyltriazole with a 1,3,5-thiadiazole such as a 2,5-bis(alkyldithio)-1,3,4-thiadiazole. The 1,3,4-thiadiazoles are generally synthesized from hydrazine and carbon disulfide by known procedures. See, for example, U.S. Pat. Nos. 2,765,289; 2,749,311; 2,760,933; 2,850,453; 2,910,439; 3,663,561; and 3,810,549.

Rust or corrosion inhibitors are another type of inhibitor additive for use in embodiments of the present disclosure. Such materials include monocarboxylic acids and polycarboxylic acids. Examples of suitable monocarboxylic acids are octanoic acid, decanoic acid and dodecanoic acid. Suitable polycarboxylic acids include dimer and trimer acids such as are produced from such acids as tall oil fatty acids, oleic acid, linoleic acid, or the like. Another useful type of rust inhibitor may comprise alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride, and the like. Also useful are the half esters of alkenyl succinic acids having 8 to 24 carbon atoms in the alkenyl group with alcohols such as the polyglycols. Other suitable rust or corrosion inhibitors include ether amines; acid phosphates; amines; polyethoxylated compounds such as ethoxylated amines, ethoxylated phenols, and ethoxylated alcohols; imidazolines; aminosuccinic acids or derivatives thereof, and the like. Materials of these types are available as articles of commerce. Mixtures of such rust or corrosion inhibitors can be used. The amount of corrosion inhibitor in the slideway formulations described herein may range from about 0.01 to about 2.0 wt % based on the total weight of the formulation.

Demulsifiers

A small amount of a demulsifying component may be used. A preferred demulsifying component is described in EP 330,522. Such demulsifying component may be obtained by reacting an alkylene oxide with an adduct obtained by reacting a bis-epoxide with a polyhydric alcohol. The demulsifier should be used at a level not exceeding 0.1 mass % active ingredient. A treat rate of 0.001 to 0.05 mass 9% active ingredient is convenient.

Pour Point Depressants

Pour point depressants, otherwise known as lube oil flow improvers, lower the minimum temperature at which the fluid will flow or can be poured. Such additives are well known. Typical of those additives which improve the low temperature fluidity of the fluid are $C_8$ to $C_{18}$ dialkyl fumarate/vinyl acetate copolymers, polyalkylmethacrylates, polystyrenesuccinate esters, and the like.

Tackiness Agents

Tackiness agents (TA) function to impart high and low temperature operability to a lubricating oil. The TA used may have that sole function, or may be multifunctional.

Suitable TA are polyisobutylene, copolymers of ethylene and propylene and higher alpha-olefins, polymethacrylates, polyalkylmethacrylates, methacylate copolymers, copolymers of an unsaturated dicarboxylic acid and a vinyl compound, inter polymers of styrene and acrylic esters, and partially hydrogenated copolymers of styrene/isoprene, styrene/butadiene, and isoprene/butadiene, as well as the partially hydrogenated homopolymers of butadiene and isoprene and isoprene/divinylbenzene.

The additives are typically blended into the base oil in an amount that enables that additive to provide its desired function. Representative effective amounts of additives, when used in lubricant formulations, are listed in Table 1 below. All the values listed are stated as weight percent active ingredient. These values are provided merely as exemplary ranges, and are not intended to limit the embodiments in any way.

TABLE 1

| Component | Wt % (Broad) | Wt % (Typical) |
|---|---|---|
| Phosphonate Monoester | 0.01 to 1 | 0.01 to 0.5 |
| Diester Phosphite | 0.01 to 0.5 | 0.01 to 0.15 |
| Phosphonate Diester | <0.25 | <0.15 |
| Extreme Pressure/Antiwear | 0.16 to 0.75 | 0.2 to 0.4 |
| Sulfur Containing Phosphoric Acid Ester | 0.01 to 0.05 | 0.02 to 0.04 |
| Corrosion inhibitor | 0.005 to 0.1 | 0.01 to 0.05 |
| Friction Modifier | <1 | <0.5 |

TABLE 1-continued

| Component | Wt % (Broad) | Wt % (Typical) |
|---|---|---|
| Antifoaming Agent | 0.001 to 0.05 | 0.007 to 0.03 |
| Pour Point Depressant | 0.1 to 0.4 | 0.25 |
| Tackiness Agent | 0.5 to 2 | 0.5 to 1 |
| Base oil | Balance | Balance |

While the above discussion describes various exemplary additional additives in the lubricating oil compositions herein under particular functional categories, it will be appreciated that additives are not limited to such categories' noted function. Many additives are multi-functional and can perform one or functions within the lubricant at the same time or provide different functionality depending on the treat rate or additive package blend used in the oil. Thus, the above discussion is not intended to be limiting to the described component's functionality. The additives may be added directly to the lubricating oil composition or base oil. In one embodiment, however, the additives may be diluted with a substantially inert, normally liquid organic diluent such as mineral oil, synthetic oil, naphtha, alkylated (e.g. $C_{10}$ to $C_{13}$ alkyl)benzene, toluene or xylene to form an additive concentrate. Above amounts in Table 1 do not include any diluent oil.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise or apparent from the context of discussion, all percentages, ratios, and parts noted in the Examples and elsewhere in this disclosure are by weight.

EXAMPLES

Example 1

A lubricating oil composition consistent with the present disclosure was evaluated for separability from various metal working fluids according the SKC separability test. This test procedure is available on request from SKC gleittechnik GmbH, Germany, Postfach 1420, D-96469 Rödental, Germany.

Inventive and comparative lubricating oil compositions of Table 2 below were evaluated for separability from metal working fluids based on SKC separability. The results are provided in Table 3. In general, a 1 hour average SKC separability of all 12 MWF below about 2 is desired and the lower the number the better. In Samples A-G below, the lubricating oil compositions included methyl octadecyl phosphonate (MOP, Afton Chemical), dimethyl octadecyl phosphonate (DMOP, Afton Chemical), or dioleyl hydrogen phosphite (Duraphos AP 240L, Rhodia, Inc.) combined with the same blend of further additives and the balance being base oil (Group 1 mineral oil, iso68 (Exxon Mobil)).

TABLE 2

| Lubricating Oil Compositions | | | | |
|---|---|---|---|---|
| Sample ID | | MOP, wt % | DMOP, wt % | DOHP, wt % |
| A | Inventive | 0.04 | — | — |
| B | Comparative | — | 0.0416 | — |

TABLE 2-continued

Lubricating Oil Compositions

| Sample ID | | MOP, wt % | DMOP, wt % | DOHP, wt % |
|---|---|---|---|---|
| C | Comparative | — | 0.25 | — |
| D | Comparative | — | — | 0.0669 |
| E | Comparative | — | — | 0.4021 |
| F | Comparative | — | 0.25 | 0.4021 |
| G | Inventive | 0.04 | — | 0.4021 |

TABLE 3A

SKC Separability Results

| Sample ID | Test Fluid | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | 1, 1, 1 | 3, 1, 1 | 1, 1, 1 | 1, 1, 1 | 1, 1, 1 | 1, 1, 1 | 1, 1, 1 | 1, 1, 1 | 6, 5, 4 | 1, 1, 1 | 1, 1, 1 | 2, 1, 1 |
| B | 1, 1, 1 | 3, 1, 1 | 1, 1, 1 | 1, 1, 1 | 1, 1, 1 | 1, 1, 1 | 1, 1, 1 | 1, 1, 1 | 6, 5, 5 | 1, 1, 1 | 1, 1, 1 | 2, 1, 1 |
| C | 1, 1, 1 | 4, 2, 1 | 1, 1, 1 | 1, 1, 1 | 1, 1, 1 | 1, 1, 1 | 1, 1, 1 | 2, 1, 1 | 6, 5, 5 | 1, 1, 1 | 1, 1, 1 | 3, 2, 1 |
| D | 1, 1, 1 | 4, 3, 2 | 1, 1, 1 | 1, 1, 1 | 1, 1, 1 | 1, 1, 1 | 1, 1, 1 | 1, 1, 1 | 6, 5, 4 | 1, 1, 1 | 1, 1, 1 | 2, 1, 1 |
| E | 1, 1, 1 | 4, 4, 2 | 1, 1, 1 | 1, 1, 1 | 2, 1, 1 | 2, 1, 1 | 1, 1, 1 | 1, 1, 1 | 6, 5, 4 | 2, 1, 1 | 1, 1, 1 | 2, 1, 1 |
| F | 3, 1, 1 | 4, 4, 1 | 1, 1, 1 | 1, 1, 1 | 4, 1, 1 | 1, 1, 1 | 1, 1, 1 | 1, 1, 1 | 6, 5, 5 | 5, 5, 5 | 1, 1, 1 | 4, 2, 1 |
| G | — | 1, 1, 1 | 4, 1, 1 | — | — | 1, 1, 1 | 1, 1, 1 | 1, 1, 1 | 5, 5, 5 | 4, 4, 3 | 1, 1, 1 | 1, 1, 1 |

TABLE 3B

SKC Separability Results

| Sample ID | 1 Hour Average | 24 Hour Average |
|---|---|---|
| A | 1.67 | 1.33 |
| B | 1.67 | 1.33 |
| C | 1.92 | 1.5 |
| D | 1.75 | 1.5 |
| E | 2.0 | 1.58 |
| F | 2.67 | 1.92 |
| G | 2 | 1.6 |

In Tables 3A and 3B, the test fluids are per the SKC Separability Test as noted in Table 4 below by evaluating separability of about 2 ml of the selected test fluid in about 8 ml of lubricant. The mixture is then agitated at 1500 rpm for one minute and visually inspected at 1 hour, 1 day, and 7 days. The separability ratings in Tables 3A and 3B are reported per the SKC Separability Test and include ratings in the following format: X, Y, Z where X is the 1 hour rating, Y is the 24 hour rating, and Z is the 7 day rating. Ratings are based on the separation scale as shown in FIG. 6 where a 1 reflects complete separation, 2 is a partial separation, 3 reflects a separation into oil and an intermediate phase, 4 is an oil, intermediate, and emulsion phase, 5 reflects an intermediate and emulsion phase, and 6 reflects all intermediate phases. In FIG. 6, 0 represents oil, z represents an intermediate mixture, and e represents an emulsion. Average ratings includes the average of all tested fluids for the 1 hour and 24 hour evaluations as shown in Table 3B. As shown in Table 3B, inventive samples A and G had good separability ratings and as further shown in Example 3 below, also had excellent friction performance. While the comparative samples may have shown good separability ratings, as shown in Example 3 below, those samples did not also have good friction performance and/or required higher treat rates to achieve good friction.

TABLE 4

SKC Fluids

| Test Fluid No. | Fluid |
|---|---|
| 1 | Sarol 471 EP |
| 2 | Metacool BLU |
| 3 | Blasocut 2000CF |
| 4 | Hysol 30FF |
| 5 | HiSpeed 400 |
| 6 | Mobilcut 140 |

TABLE 4-continued

SKC Fluids

| Test Fluid No. | Fluid |
|---|---|
| 7 | Hebrolub 923LS |
| 8 | Bonderlite L-MR21972 |
| 9 | Hocut M724 |
| 10 | Novamet 900 |
| 11 | Rhenus FU 750 |
| 12 | Sitala A 400 |

Example 2

A further evaluation of lubricating oils including an increasing levels of dimethyl octadecyl phosphonate (DMOP) was conducted. Lubricating oil samples H through J included similar levels of additives with the same base oil of Example 1 but with increasing levels of dimethyl octadecyl phosphonate. As shown in Tables 6A and 6B, increasing the level of dimethyl octadecyl phosphonate is counterproductive to the SKC separability.

TABLE 5

Lubricating Oil Compositions

| Sample ID | MOP, wt % | DMOP, wt % | DOHP, wt % |
|---|---|---|---|
| H | 0.03 | — | 0.14 |
| I | 0.025 | 0.0625 | 0.1 |
| J | 0.03 | 0.1 | 0.1 |

TABLE 6A

SKC Separability Results

| Sample ID | Test Fluid | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| H | 1, 1, 1 | 4, 2, 2 | 1, 1, 1 | 2, 1, 1 | 1, 1, 1 | 1, 1, 1 | 1, 1, 1 | 1, 1, 1 | 4, 1, 1 | 4, 1, 1, | 1, 1, 1 | 2, 1, 1 |
| I | 1, 1, 1 | 5, 3, 2 | 1, 1, 1 | 4, 1, 1 | 2, 1, 1 | 1, 1, 1 | 2, 1, 1 | 1, 1, 1 | 4, 1, 1 | 2, 1, 1 | 1, 1, 1 | 2, 1, 1 |
| J | 1, 1, 1 | 4, 2, 2 | 1, 1, 1 | 4, 2, 1 | 3, 2, 1 | 1, 1, 1 | 2, 1, 1 | 1, 1, 1 | 5, 1, 1 | 5, 3, 2 | 1, 1, 1 | 2, 1, 1 |

TABLE 6B

SKC Separability Results

| Sample ID | 1 Hour Average | 24 Hour Average |
|---|---|---|
| H | 1.9 | 1.1 |
| I | 2.2 | 1.2 |
| J | 2.5 | 1.4 |

Example 3

Lubricant Samples A-G from Table 2 of Example 1 were further evaluated for coefficient of friction in terms of dynamic friction performance using the Darmstadt test method as described in Slideway Lubrication and Friction Testing, Ingram, M. and Norris, P., 10th International Symposium on Fuels and Lubricants, 2016, Paper ID-070.

In general, a diagram of an exemplary Darmstadt Rig available at Afton Chemical Corporation is shown in FIG. 5. The rig is based on the slideway configuration of a surface grinder machine. The bed of the test rig, including the lead screw, is from a grinding machine and the range of loads that can be applied to the table are representative of actual machines, enabling the rig to replicate the surface pressures relevant to many hydrodynamic slideways. The sliding table operates at low speed between 0.01 mm/min and 3000 mm/min, encompassing the normal working and transitional speeds of a machine tool. The drive carriage rolls along the guideways on linear roller bearings driven by the leadscrew, while the sliding table slides along the guideways on the four sliding elements. The sliding table is connected to the drive carriage by a load cell. The load cell is coupled to an amplifier and can measure small fluctuations in friction coefficient as well as stick-slip.

Both slideways in the rig are made from steel (hardened and ground) and are 125×53×2400 mm in dimensions. The four sliding elements are ground and uniformly fastened to a sliding carriage using a torque wrench. They are each 200×50 mm, which is similar in size to a milling machine. The sliding elements include lubricant delivery. The lubricant is gravity fed to the contact through cut-outs in the sliding elements from a small reservoir. To ensure parallel surfaces, the sliding surfaces are broken in for approximately 1-2 weeks, at a speed of 100 mm/min. Two motors are available to drive the leadscrew by a belt. Motor 1 is used for the higher speed range (25-3000 mm/min), while motor 2, which is coupled to the lead screw via a gearbox, is used for the lower speeds and the static friction measurement, achieving speeds of 0.01 to 25 mm/min. The surface pressures on machine tool slideways are generally found to be in the 10-50 MPa range. Commercial slideways operate at room temperature, as is the case for the Examples herein, where the temperature of the oil and slideway is about 18-23° C.

The test surfaces (guideways and sliding elements) are cleaned, before drying with a compressed air gun. Also cleaned are the oil reservoirs and the oil feed lines. The sliding carriages are then lowered onto the test bed, with the assistance of a crane, to form the lubricated contact. The load cell is calibrated using a 10 kg dead weight, and then installed between the two carriages. The oil is then added to the small reservoirs and the dead weights are added to the carriage. A run-in phase is then performed with the sliding elements sliding at 100 mm/min for 10 minutes. The coefficient of friction is then measured at discrete sliding speeds between 3000 and 0.01 mm/min, in descending order. The average friction coefficient is calculated by taking the average of the measured force signal for both directions of slideway traverse.

Further details on the test procedure are detailed in the journal article noted above—Slideway Lubrication and Frication Testing by Marc Ingram and Paul Norris. Results of the Darmstadt Rig friction testing are shown in FIGS. 1 through 3. As shown in these figures, Sample A, which was a low treat rate of methyl octadecyl phosphonate, had a substantially better (that is, lower) coefficient of friction comparable to Sample B, which had the same treat rate of a phosphonate diester in the oil as compared to the inventive monoester phosphonate, of Sample A. While comparative Sample C had similar friction performance as Inventive Sample A, Sample C had a much higher treat rate of the phosphonate diester and, as shown in Example 1, Sample A also had excellent SKC Separability while Sample C had poor SKC Separability. Additionally, while sample F, which was a blend of dimethyl octadecyl phosphonate and dioleyl phosphite, exhibits good friction performance, as shown in Example 1, sample F had the worst SKC separability rating.

Also shown in Table 6C below, the friction coefficient of Samples A through G from the Darmstadt rig at 0.1, 1, 10, 100, 1000, and 2000 mm/min sliding speeds. In general, inventive Sample A demonstrates about 6 to about 25% improvement in dynamic friction coefficient over comparative Sample B.

TABLE 6C

Friction Coefficient

| Sample ID | Friction Coefficient at Sliding Speed, mm/min | | | | | |
|---|---|---|---|---|---|---|
| | 0.1 | 1 | 10 | 100 | 1000 | 2000 |
| A | 0.0625 | 0.0800 | 0.1009 | 0.1115 | 0.0476 | 0.0189 |
| B | 0.0769 | 0.0922 | 0.1139 | 0.1165 | 0.0498 | 0.0208 |
| C | 0.0610 | 0.0778 | 0.0974 | 0.1078 | 0.0476 | 0.0201 |
| D | 0.0842 | 0.0977 | 0.1141 | 0.1181 | 0.0491 | 0.0202 |
| E | 0.0753 | 0.0889 | 0.1050 | 0.1123 | 0.0491 | 0.0207 |
| F | 0.0544 | 0.0707 | 0.0893 | 0.0969 | 0.0404 | 0.0166 |
| G | 0.0422 | 0.0562 | 0.0772 | 0.0974 | 0.0488 | 0.0221 |

Example 4

Further additional slideway lubricant samples were evaluated for SKC Separability and Darmstadt friction coefficient as described by the procedures of Example 1 and 3. The lubricant samples are shown in Table 7 with the corresponding SKC separability ratings in Tables 8A and 8B. Samples K, L, and N used a blended Group I and Group III base oil. Sample M used a Group I base oil. Darmstadt friction results are shown in FIG. 4 and Table 9 below.

TABLE 7

Lubricating Oil Compositions in Base Oil

| Sample ID | | MOP, wt % | DMOP, wt % | DOHP, wt % |
|---|---|---|---|---|
| K | Inventive | 0.04 | — | 0.14 |
| L | Inventive | 0.025 | — | 0.16 |
| M | Comparative | — | 0.3 | — |
| N | Comparative | — | — | 0.212 |

TABLE 8A

SKC Separability Results

| Sample ID | Test Fluid | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| K | 2, 1, 1 | 1, 1, 1 | 1, 1, 1 | 1, 1, 1 | 2, 1, 1 | 1, 1, 1 | 1, 1, 1 | 1, 1, 1 | 1, 1, 1 | 1, 1, 1 | 1, 1, 1 | 1, 1, 1 |
| L | 4, 2, 1 | 1, 1, 1 | 2, 1, 1 | 1, 1, 1 | 3, 1, 1 | 2, 1, 1 | 1, 1, 1 | 1, 1, 1 | 1, 1, 1 | 2, 1, 1 | 1, 1, 1 | 1, 1, 1 |
| M | 4, 4, 4 | 4, 2, 2 | 1, 1, 1 | 3, 2, 2 | 1, 1, 1 | 1, 1, 1 | 1, 1, 1 | 1, 1, 1 | 5, 4, 4 | 5, 4, 4 | 1, 1, 1 | 1, 1, 1 |
| N | 1, 1, 1 | 1, 1, 1 | 1, 1, 1 | 1, 1, 1 | 1, 1, 1 | 1, 1, 1 | 1, 1, 1 | 1, 1, 1 | 1, 1, 1 | 1, 1, 1 | 1, 1, 1 | 1, 1, 1 |

TABLE 8B

SKC Separability Results

| Sample ID | 1 Hour Average | 24 Hour Average |
|---|---|---|
| K | 1.16 | 1.0 |
| L | 1.67 | 1.08 |
| M | 2.3 | 1.91 |
| N | 1.0 | 1.0 |

TABLE 9

Darmstadt Rig Data

| Sample ID | Friction Coefficient at Sliding speed mm/min | | | | | |
|---|---|---|---|---|---|---|
| | 0.1 | 1 | 10 | 100 | 1000 | 2000 |
| K | 0.0427 | 0.0555 | 0.0704 | 0.0940 | 0.0481 | 0.0212 |
| L | 0.0561 | 0.0697 | 0.0846 | 0.0985 | 0.0467 | 0.0194 |
| M | 0.0865 | 0.1000 | 0.1153 | 0.1182 | 0.0579 | 0.0267 |
| N | 0.0625 | 0.0780 | 0.0980 | 0.1043 | 0.0448 | 0.0176 |

FIG. 4 shows the Darmstadt Rig friction data for samples K-N showing that inventive samples K and L having the lowest friction as well as the lowest average 1 hour SKC separability ratings. While sample N may have had a good Separability rating, sample N has the worst coefficient of friction as shown in FIG. 4 and, thus, could not achieve the dual benefits of friction and separability as the inventive samples herein.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification are to be understood as being modified in all instances by the term "about," whether or not the term "about" is present. Accordingly, unless indicated to the contrary, the numerical parameters set forth in the specification are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A slideway lubricant composition exhibiting good friction performance and good separability from metal working fluid at the same time, the slideway lubricant composition including
a major amount of a base lubricating oil;
a phosphorous containing friction modifier providing 0.025 to 0.04 weight percent of a hydrocarbyl phosphonate monoester to the slideway lubricant composition;
the hydrocarbyl phosphonate monoester including a C1 alkyl group in the monoester moiety and 18 carbon atoms in the hydrocarbyl moiety;
0.14 to 0.4021 weight percent of a dioleyl hydrogen phosphite; and
wherein the slideway lubricant composition has a lower friction coefficient than a slideway lubricant composition including a phosphonate diester instead of the hydrocarbyl phosphonate monoester and also has an average one hour SKC Separability from metal working fluids lower than 2.

2. The slideway lubricant composition of claim 1, wherein the slideway lubricant composition has a lower friction coefficient than a slideway lubricant composition including the same amount of a phosphonate diester; and wherein the slideway lubricant composition also has an average one hour SKC separability from metal working fluids lower than about 2.

3. The slideway lubricant composition of claim 1, wherein the phosphorous containing friction modifier has a weight ratio of the hydrocarbyl phosphonate monoester to the dioleyl hydrogen phosphite from about 0.02:1 to about 10:1.

4. The slideway lubricant composition of claim 1, wherein an amount of phosphorous in the form of a phosphonate in the phosphorous containing friction modifier is about 30 to about 80 percent of the total phosphorous provided by the hydrocarbyl phosphonate monoester and the dioleyl hydrogen phosphite.

5. The slideway lubricant composition of claim 1, wherein the hydrocarbyl phosphonate monoester has the formula

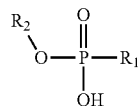

wherein $R_1$ is a $C_{18}$ hydrocarbyl group and $R_2$ is a methyl group.

6. The slideway lubricant composition of claim 1, further comprising less than about 0.25 weight percent of a phosphonate diester.

7. The slideway lubricant composition of claim 6, wherein the phosphonate diester has the formula

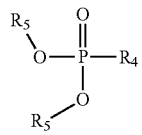

wherein $R_4$ is a $C_1$ to $C_{30}$ hydrocarbyl group and each $R_5$ is independently a $C_1$ to $C_4$ alkyl groups.

8. The slideway lubricant composition of claim 1, wherein the slideway lubricant composition further includes one or more amine salts of phosphate esters derived from mono or di-alkyl or alkenyl phosphate esters and alkyl or alkenyl primary or secondary amines.

9. The slideway lubricant composition of claim 1, wherein the slideway lubricant composition further includes sulfur-containing lubricant additives selected from sulfurized hydrocarbons, sulfurized olefins, dialkyl polysulfides, diarylpolysulfides, sulfurized fatty acids, sulfurized fatty acid esters, and mixtures thereof.

10. The slideway lubricant composition of claim 1, further comprising an acidic thiophosphate or a thiophosphate ester.

11. The slideway lubricant composition of claim 10, wherein the acidic thiophosphate or thiophosphate ester has the formula

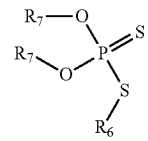

wherein $R_6$ is a C1 to C10 linear or branched carboxylic group or a C1 to C10 linear or branched alkyl alkanoate group and each $R_7$ is independently a linear or branched C1 to C10 hydrocarbyl group.

12. The slideway lubricant composition of claim 1, further comprising saturated, monounsaturated, or polyunsaturated C12 to C30 fatty acids or fatty acid esters.

13. The slideway lubricant composition of claim 1, wherein the phosphorous containing friction modifier has a weight ratio of the hydrocarbyl phosphonate monoester to dioleyl hydrogen phosphite from about 0.09:1 to about 0.3:1.

* * * * *